(12) United States Patent
Mercuri et al.

(10) Patent No.: US 10,018,134 B2
(45) Date of Patent: Jul. 10, 2018

(54) METHOD AND APPARATUS FOR REGENERATING A LEAN NOX TRAP IN A TURBOCHARGED INTERNAL COMBUSTION ENGINE

(71) Applicant: GM GLOBAL TECHNOLOGY OPERATIONS LLC, Detroit, MI (US)

(72) Inventors: Davide Francesco Mercuri, Turin (IT); Paolo Olmo, Turin (IT); Davide Gessaroli, Turin (IT); Giorgio Nati, Villar Focchiardo (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 49 days.

(21) Appl. No.: 15/041,731

(22) Filed: Feb. 11, 2016

(65) Prior Publication Data

US 2016/0230685 A1   Aug. 11, 2016

(30) Foreign Application Priority Data

Feb. 11, 2015   (DE) .................... 20 2015 001 094 U (51) Int. Cl.
*F01N 3/08*       (2006.01)
*F02B 37/16*      (2006.01)
(Continued)

(52) U.S. Cl.
CPC ....... *F02D 41/0275* (2013.01); *F01N 3/0885* (2013.01); *F02B 29/04* (2013.01);
(Continued)

(58) Field of Classification Search
CPC ...... F01N 3/0885; F02B 29/04; F02B 37/168; F02B 37/18; F02D 41/0007;
(Continued)

(56) References Cited

U.S. PATENT DOCUMENTS 6,234,139 B1 *   5/2001   Taga ................... F02D 41/0002
                                                           123/295
6,318,083 B1 *  11/2001   Machida ................ F02D 23/00
                                                            60/601

(Continued)

FOREIGN PATENT DOCUMENTS

EP        1106804 A1       6/2001
JP    2009191817 A    *    8/2009

OTHER PUBLICATIONS

Machine Translation of JP 2009191817.*
German Patent Office, German Search Report for German Application No. 202015001094.6, dated May 26, 015.

*Primary Examiner* — Brandon Lee
(74) *Attorney, Agent, or Firm* — Lorenz & Kopf, LLP (57) ABSTRACT

A method and apparatus for regenerating a Lean NOx Trap in an internal combustion engine is disclosed. The internal combustion engine includes a Lean NOx Trap, a turbocharger having a turbine. An electronic control unit is configured to execute a regeneration event of the Lean NOx Trap, and regulate a position of an actuator affecting a rotating speed of the turbine using a closed-loop control strategy of an air pressure into an intake duct downstream of a compressor of the turbocharger and upstream of a throttle valve during the execution of the regeneration event.

13 Claims, 3 Drawing Sheets

(51) Int. Cl.
  *F02D 41/00* (2006.01)
  *F02D 41/02* (2006.01)
  *F02B 29/04* (2006.01)
  *F02B 37/18* (2006.01)
  *F02M 26/05* (2016.01)
  *F02D 9/02* (2006.01)
  *F02M 26/25* (2016.01)

(52) U.S. Cl.
  CPC ............ *F02B 37/168* (2013.01); *F02B 37/18* (2013.01); *F02D 41/0007* (2013.01); *F02M 26/05* (2016.02); *F02D 2009/0225* (2013.01); *F02D 2009/0228* (2013.01); *F02M 26/25* (2016.02); *Y02T 10/144* (2013.01); *Y02T 10/146* (2013.01)

(58) Field of Classification Search
  CPC ......... F02D 41/0275; F02D 2009/0225; F02D 2009/0228; F02M 26/05; F02M 26/25; Y02T 10/144; Y02T 10/146
  See application file for complete search history.

(56) References Cited

U.S. PATENT DOCUMENTS

| | | | |
|---|---|---|---|
| 7,010,914 B1* | 3/2006 | Roberts, Jr. | F01N 3/0835 123/564 |
| 7,716,924 B2 | 5/2010 | Tanaka | |
| 2005/0022516 A1* | 2/2005 | Miura | F02D 41/0275 60/295 |
| 2007/0062188 A1* | 3/2007 | Fry | F02B 37/013 60/599 |
| 2007/0089401 A1* | 4/2007 | Nieuwstadt | F02D 41/0065 60/285 |
| 2014/0298802 A1* | 10/2014 | Suzuki | F02D 13/02 60/602 |

* cited by examiner

METHOD AND APPARATUS FOR REGENERATING A LEAN NOX TRAP IN A TURBOCHARGED INTERNAL COMBUSTION ENGINE

CROSS-REFERENCE TO RELATED APPLICATION

This application claims priority to German Patent Application No. 202015001094.6, filed Feb. 11, 2015, which is incorporated herein by reference in its entirety.

TECHNICAL FIELD

The present disclosure relates to a turbocharged internal combustion engine. In particular, the present disclosure relates to a turbocharged internal combustion engine and an automotive system equipped with a Lean $NO_x$ Trap.

BACKGROUND

It is known that the aftertreatment system of a turbocharged internal combustion engine can be provided, among other devices, with a Lean $NO_x$ Trap (LNT) which represents a cost effective alternative to Selective Catalytic Reduction (SCR). The LNT is a catalytic device containing catalysts, such as Rhodium, Platinum and/or Palladium, and adsorbents, such as barium based elements, which provide active sites suitable for binding and trapping the nitrogen oxides ($NO_x$) contained in the exhaust gas. In order to periodically restore its original efficiency, the Lean NOx Trap (LNT) needs to be subjected to a regeneration process or event, whereby the trapped nitrogen oxides ($NO_x$) are reduced and desorbed. This regeneration event is performed by switching the internal combustion engine from a lean operation mode to a rich operation mode (e.g. lambda value of 0.95 or close to 1), so that the $NO_x$ stored on the adsorbent active sites of the LNT are desorbed and reduced by the reductants contained in the exhaust gas.

For the purpose of guaranteeing safe regeneration events, the electronic control unit of the internal combustion engine is generally configured to activate the regeneration event only if the operating point of the internal combustion engine is confined into a pre-calibrated area, i.e. a so-called rich mode area, of the engine speed—engine torque diagram. In particular, the rich mode area is delimited by an upper curve, in order to guarantee that, over predetermined upper threshold values of the engine torque (for example 230-250 Nm), the regeneration events are stopped or avoided. In fact, a regeneration event performed while the engine is operating above the upper curve could subject the aftertreatment devices to high thermal stresses, particularly because the current control strategies of the turbocharger do not permit to control the boost pressure with the necessary precision. However, it has been observed that a regeneration event performed at high load conditions may be more efficient in terms of $NO_x$ conversion and may result in lower fuel consumption, so that an upper extension of the rich mode area is generally desirable.

SUMMARY

In accordance with the present disclosure, an internal combustion engine is provided performs regeneration events for the LNT in high load operating conditions of the internal combustion engine, allowing a more efficient $NO_x$ reduction and a lower fuel consumption during regeneration events.

An embodiment of the disclosure provides an internal combustion engine including a Lean NOx Trap, a turbocharger having a turbine and, an electronic control unit configured to execute a regeneration event of the Lean NOx Trap, and regulate a position of an actuator affecting a rotating speed of the turbine using a closed-loop control strategy of an air pressure into an intake duct downstream of a compressor of the turbocharger and upstream of a throttle valve during the execution of the regeneration event. As a result, the boost pressure control during the regeneration event is very precise and makes it possible to perform a safe regeneration event also under high load operating conditions of the internal combustion engine. In this way, it is possible to superiorly extend the rich mode area, for example over the full load curve, thereby increasing the frequency of the regeneration events, increasing the probability to complete each regeneration event successfully and allowing a more efficient $NO_x$ reduction and a lower fuel consumption during regeneration events.

According to an aspect of the present disclosure, the electronic control unit may be configured to perform the closed-loop control strategy. A pressure value of the air into the intake duct downstream of the compressor and upstream of the throttle valve and a target value thereof are determined. A difference between the pressure value and the target value is calculated and used as an input of a first controller configured to regulate the position of the actuator in such a way to minimize the calculated difference. This aspect of the present disclosure provides a simple and practical solution to actuate the closed-loop control strategy of the air pressure into the intake duct.

According to a further aspect of the present disclosure, the electronic control unit may be configured to determine the position of the actuator based on an engine speed and an engine torque. In this way, the regulation of the position of the actuator and, thus, the rotating speed of the turbine becomes faster and thus more effective during transients.

According to an aspect of the present disclosure, the electronic control unit may be configured to estimate the air pressure value on the basis of a position of the throttle valve. In this way, a control of the air pressure value may be achieved without modifying the internal combustion engine layout.

Alternatively, the electronic control unit may be configured to measure the air pressure value by means of a pressure sensor disposed in the intake duct downstream of the compressor and upstream of the throttle valve. In this way, a precise determination of the air pressure value may be achieved.

According to an embodiment of the present disclosure, the electronic control unit may be configured to regulate a position of the throttle valve by means of a second closed-loop control strategy of an air pressure into an intake manifold downstream of the throttle valve during the execution of the regeneration event. This aspect of the present disclosure precisely controls the air mass flow rate entering the engine during the regeneration event.

Further, the electronic control unit may be configured to perform a second closed-loop control strategy. A pressure value of the air into the intake manifold and a target value thereof are determined. A difference between the pressure value and the target value is calculated and used as an input of a second controller configured to regulate the position of the throttle valve in such a way to minimize the calculated difference. This aspect of the present disclosure provides a simple and practical solution to actuate the closed-loop control strategy of the air pressure into the intake manifold.

Again, the electronic control unit may be configured to determine the position of the throttle valve based on an air pressure value into the intake duct downstream of the compressor and upstream of the throttle valve, an air temperature value into the intake duct downstream of the compressor and upstream of the throttle valve, a target value of an air mass flow rate through the throttle valve and the determined target value of the air pressure into the intake manifold. In this way, the regulation of the position of the throttle valve becomes faster and thus more effective during transients.

According to a further embodiment of the present disclosure, the internal combustion engine may further include an exhaust gas recirculation duct, coupled between an exhaust manifold of the engine combustion chamber and an intake manifold, and an exhaust gas recirculation valve regulating a flow of exhaust gases in the exhaust gas recirculation duct. During the execution of the regeneration event the electronic control unit may be configured to determine a quantity value of the exhaust gas recirculated and a target value thereof, and calculate a difference between the quantity value and the target value. The calculated difference is used as an input of a third controller configured to regulate the position of the exhaust gas recirculation valve in such a way to minimize the calculated difference. As a result, a precise and efficient closed-loop control on the quantity value of the exhaust gas recirculated in the exhaust gas recirculation duct may be performed during the regeneration event.

According to another embodiment of the present disclosure, the internal combustion engine may further include a fuel injector configured to inject fuel into the combustion chamber. During the execution of the regeneration event, the electronic control unit may be configured to determine a lambda value of the exhaust gas and a target value thereof and calculate a difference between the target value and the determined lambda value. The calculated difference is used as an input of a fourth controller configured to regulate a fuel quantity injected by the fuel injector as an after-injection in such a way to minimize the calculated difference. As a result, a precise and efficient closed-loop control on the lambda value of the exhaust gas may be performed during the regeneration event.

Another embodiment of the present disclosure provides an automotive system, in particular a passenger car, including an internal combustion engine, as described above.

Another embodiment of the present disclosure provides a method for controlling a regeneration event of a Lean $NO_x$ Trap in an internal combustion engine including a turbocharger having a turbine. In particular, a regeneration event of the Lean $NO_x$ Trap is executed. During the execution of the regeneration event, a position of an actuator affecting a rotating speed of the turbine is determined by a closed-loop control strategy of an air pressure into an intake duct downstream of a compressor of the turbocharger and upstream of a throttle valve. As a result, the boost pressure control during the regeneration event is very precise and makes it possible to perform a safe regeneration event also under high load operating conditions of the internal combustion engine. In this way, it is possible to superiorly extend the rich mode area, for example till the full load curve, thereby increasing the frequency of the regeneration events, increasing the probability to complete each regeneration event successfully and allowing a more efficient $NO_x$ reduction and lower fuel consumption during regeneration events.

According to an aspect of the present disclosure, the closed-loop control strategy determines a pressure value of the air into the intake duct downstream of the compressor and upstream of the throttle valve and a target value thereof and calculates a difference between the pressure value and the target value. The calculated difference is used as an input of a first controller configured to regulate the position of the actuator in such a way to minimize the calculated difference. This aspect of the present disclosure provides a simple and practical solution to actuate the closed-loop control strategy of the air pressure into the intake duct.

According to a further aspect of the present disclosure, the method may include a determination of the position of the actuator based on an engine speed and an engine torque. In this way, the regulation of the position of the actuator and, thus, the rotating speed of the turbine becomes faster and thus more effective during transients.

According to an aspect of the present disclosure, determining the air pressure value may be performed by estimating the air pressure value on the basis of a position of the throttle valve. In this way, a control of the air pressure value may be achieved without modifying the internal combustion engine layout.

In alternative, determination of the air pressure value may be performed by measuring the air pressure value by means of a pressure sensor disposed in the intake duct downstream of the compressor and upstream of the throttle valve. In this way, a precise determination of the air pressure value may be achieved.

According to an embodiment of the present disclosure, the method may further include regulating a position of the throttle valve by means of a second closed-loop control strategy of an air pressure into an intake manifold downstream of the throttle valve during the execution of the regeneration event. This aspect of the present disclosure precisely controls the air mass flow rate entering the engine during the regeneration event.

Further, a second closed-loop control strategy may be performed in which a pressure value of the air into the intake manifold and a target value thereof are determined, and a difference between the pressure value and the target value is calculated. The calculated difference as an input of a second controller configured to regulate the position of the throttle valve in such a way to minimize the calculated difference. This aspect of the present disclosure provides a simple and practical solution to actuate the closed-loop control strategy of the air pressure into the intake manifold.

Again, the method may include determining the position of the throttle valve based on an air pressure value into the intake duct downstream of the compressor and upstream of the throttle valve, an air temperature value into the intake duct downstream of the compressor and upstream of the throttle valve, a target value of an air mass flow rate through the throttle valve and the determined target value of the air pressure into the intake manifold. In this way, the regulation of the position of the throttle valve becomes faster and thus more effective during transients.

According to a further embodiment of the present disclosure, the internal combustion engine may further include an exhaust gas recirculation duct, coupled between an exhaust manifold of the engine combustion chamber and an intake manifold, and an exhaust gas recirculation valve regulating a flow of exhaust gases in the exhaust gas recirculation duct. During the execution of the regeneration event, the method may further include determining a quantity value of the exhaust gas recirculated and a target value thereof and calculating a difference between the quantity value and the target value. The calculated difference is used as an input of a third controller configured to regulate the position of an exhaust gas recirculation valve in such a way to minimize the calculated difference. As a result, a precise and efficient closed-loop control on the quantity value of the exhaust gas recirculated in the exhaust gas recirculation duct may be performed during the regeneration event.

According to another embodiment of the present disclosure, the internal combustion engine may further include a fuel injector configured to inject fuel into the combustion chamber. During the execution of the regeneration event, the method may include determining a lambda value of the exhaust gas and a target value thereof and calculating a difference between the target value and the determined lambda value. The calculated difference is used as an input of a fourth controller configured to regulate a fuel quantity injected by a fuel injector as an after-injection in such a way to minimize the calculated difference. As a result, a precise and efficient closed-loop control on the lambda value of the exhaust gas may be performed during the regeneration event.

Another embodiment of the present disclosure provides an apparatus for the control of a regeneration event of a Lean $NO_x$ Trap in an internal combustion engine including a turbocharger having a turbine. The control apparatus includes an electronic control unit configured to execute a regeneration event of the Lean $NO_x$ Trap, and to regulate a position of an actuator affecting a rotating speed of the turbine by means of a closed-loop control strategy of an air pressure into an intake duct downstream of a compressor of the turbocharger and upstream of a throttle valve, during the execution of the regeneration event. As a result, the boost pressure control during the regeneration event is very precise and makes it possible to perform a safe regeneration event also under high load operating conditions of the internal combustion engine. In this way, it is possible to superiorly extend the rich mode area, for example till the full load curve, thereby increasing the frequency of the regeneration events, increasing the probability to complete each regeneration event successfully and allowing a more efficient NOx reduction and lower fuel consumption during regeneration events.

According to an aspect of the present disclosure, in order to perform the closed-loop control strategy, the electronic control unit may be further configured to determine a pressure value of the air into the intake duct downstream of the compressor and upstream of the throttle valve and a target value thereof, calculate a difference between the pressure value and the target value, and use the calculated difference as an input of a first controller configured to regulate the position of the actuator in such a way to minimize the calculated difference. This aspect of the present disclosure provides a simple and practical solution to actuate the closed-loop control strategy of the air pressure into the intake duct.

According to an aspect of the present disclosure, the electronic control unit may be further configured to determine the position of the actuator based on an engine speed and an engine torque. In this way, the regulation of the position of the actuator and, thus, the rotating speed of the turbine becomes faster and thus more effective during transients.

According to an aspect of the present disclosure, the electronic control unit may be further configured to estimate the air pressure value on the basis of a position of a throttle valve. In this way, a control of the air pressure value may be achieved without modifying the internal combustion engine layout.

In alternative, the electronic control unit may be further configured to measure the air pressure value by means of a pressure sensor disposed in the intake duct downstream of the compressor and upstream of the throttle valve. In this way, a precise determination of the air pressure value may be achieved.

According to an aspect of the present disclosure, the electronic control unit may be further configured to regulate a position of the throttle valve by means of a second closed-loop control strategy of an air pressure into an intake manifold downstream of the throttle valve, during the execution of the regeneration event. This aspect of the present disclosure precisely controls the air mass flow rate entering the engine during the regeneration event.

Further, According to an aspect of the present disclosure, in order to perform a second closed-loop control strategy, the electronic control unit may be further configured to determine a pressure value of the air into the intake manifold and a target value thereof, calculate a difference between the pressure value and the target value, and use the calculated difference as an input of a second controller configured to regulate the position of the throttle valve in such a way to minimize the calculated difference. This aspect of the present disclosure provides a simple and practical solution to actuate the closed-loop control strategy of the air pressure into the intake manifold.

Again, the electronic control unit may be further configured to determine the position of the throttle valve based on an air pressure value into the intake duct downstream of the compressor and upstream of the throttle valve, an air temperature value into the intake duct downstream of the compressor and upstream of the throttle valve, a target value of air mass flow rate through the throttle valve and the determined target value of the air pressure into the intake manifold. In this way, the regulation of the position of the throttle valve becomes faster and thus more effective during transients.

According to a further embodiment of the present disclosure, the internal combustion engine may further include an exhaust gas recirculation duct, coupled between an exhaust manifold of the engine combustion chamber and an intake manifold, and an exhaust gas recirculation valve regulating a flow of exhaust gases in the exhaust gas recirculation duct. The electronic control unit may be further configured to determine a quantity value of the exhaust gas recirculated and a target value thereof, calculate a difference between the quantity value and the target value, and use the calculated difference as an input of a third controller configured to regulate the position of an exhaust gas recirculation valve in such a way to minimize the calculated difference. As a result, a precise and efficient closed-loop control on the quantity value of the exhaust gas recirculated in the exhaust gas recirculation duct may be performed during the regeneration event.

According to another embodiment of the present disclosure, the internal combustion engine may further include a fuel injector configured to inject fuel into the combustion chamber. During the regeneration event, the electronic control unit may be further configured to determine a lambda value of the exhaust gas and a target value thereof, calculate a difference between the target value and the determined lambda value, and use the calculated difference as an input of a fourth controller configured to regulate a fuel quantity injected by a fuel injector as an after-injection in such a way to minimize the calculated difference. As a result, a precise and efficient closed-loop control on the lambda value of the exhaust gas may be performed during the regeneration event.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
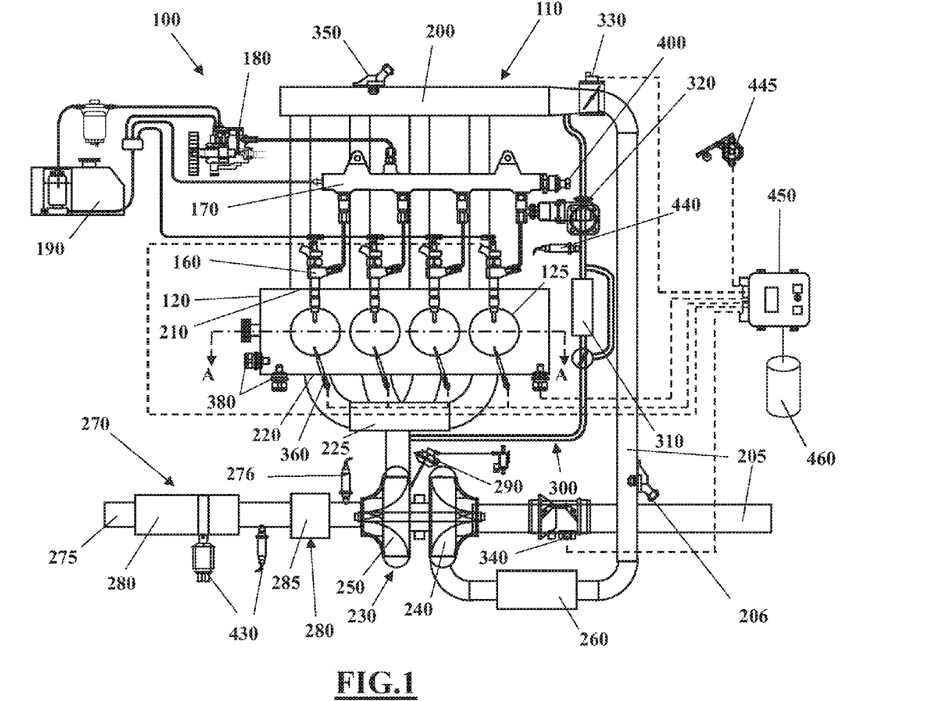
FIG. 1 shows an automotive system.
Figure 2:
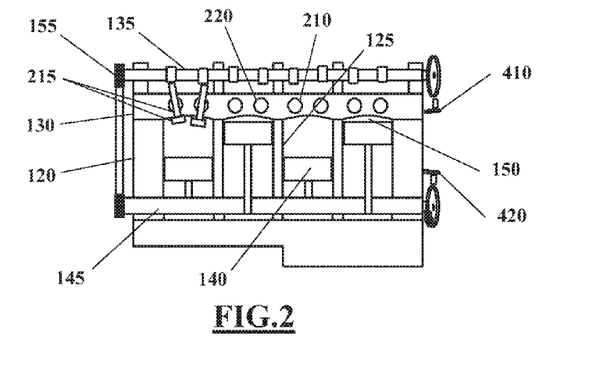
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150.

A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190.

Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle valve 330 may be provided to regulate the flow of air into the intake manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. A pressure sensor 206 may further be provided in the duct 205.

The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust gas aftertreatment system 270. This example shows a variable geometry turbine (VGT) 250 with a VGT actuator 290 arranged to move the vanes to alter the flow of the exhaust gases through the turbine 250.

Figure 7:
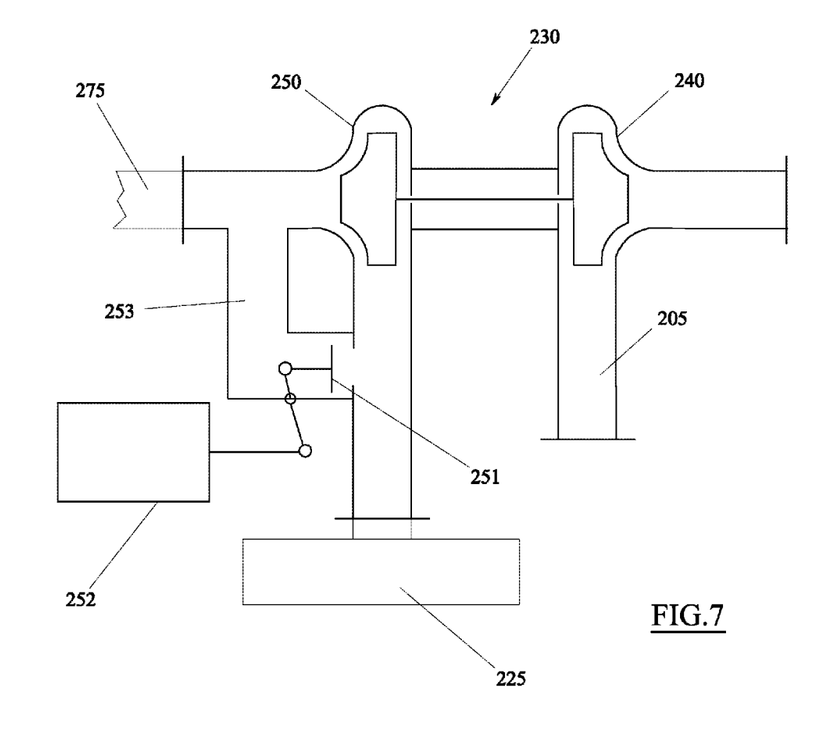
FIG. 7 shows an alternative embodiment of a turbocharger of the internal combustion engine belonging to the automotive system of FIG. 1.

In other embodiments, shown in FIG. 7, the turbocharger 230 may include a fixed geometry turbine 250 including a waste gate valve 251 actuated by a waste gate actuator 252. The waste gate valve 251 is disposed on a by-pass duct 253 which by-passes the turbine 250. The waste gate valve 251 is configured to divert exhaust gases away from the turbine 250 and the regulation of the opening of the waste gate valve 251 regulates the turbine rotating speed of the turbine 250, which in turn regulates the rotating speed of the compressor 240. In particular the waste gate valve may regulate the boost pressure in the turbocharger 230.

The exhaust gas aftertreatment system 270 may include an exhaust gas line 275 having one or more exhaust aftertreatment devices 280. The aftertreatment devices 280 may be any device configured to change the composition of the exhaust gases. Some examples of aftertreatment devices 280 include, but are not limited to, catalytic converters (two and three way), for example an oxidation catalyst (i.e. Diesel Oxidation Catalyst, DOC) and a Lean $NO_x$ Traps (LNT 285). In detail, the LNT 285 is a catalytic device containing catalysts, such as Rhodium, Platinum and/or Palladium, and adsorbents, such as Barium-based elements, which provide active sites suitable for binding the nitrogen oxides ($NO_x$) contained in the exhaust gas, in order to trap them within the device itself.

Other examples of aftertreatment devices 280 include a particulate filter (i.e. a Diesel Particulate Filter, DPF) and a selective catalytic reduction (SCR) systems. Other embodiments may include an exhaust gas recirculation (EGR) duct 300 coupled between the exhaust manifold 225 and the intake manifold 200X). The EGR duct 300 may include an EGR cooler 310 to reduce the temperature of the exhaust gases in the EGR duct 300. An EGR valve 320 regulates a flow of exhaust gases in the EGR duct 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to the above said pressure temperature 206, a mass airflow, pressure, temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445.

Furthermore, the ECU 450 may generate output signals to various control devices that are arranged to control the operation of the ICE 110, including, but not limited to, the fuel injector 160, the throttle valve 330, the EGR Valve 320, the VGT actuator 290, the waste gate actuator 252 and the cam phaser 155. Note, dashed lines are used to indicate communication between the ECU 450 and the various sensors and devices, but some are omitted for clarity.

Turning now to the ECU 450, this apparatus may include a digital central processing unit (CPU 460) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulated technique such as QPSK for digital data, such that binary data representing said computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

According to an embodiment of the present disclosure, the ECU 450 may be configured to execute a regeneration event of the LNT 285, for example a DeNO$_x$ regeneration event and/or a DeSO$_x$ regeneration event. A regeneration event of the LNT 285 may be performed by switching the internal combustion engine from the usual lean combustion mode (lambda value>>1) to a rich combustion mode (e.g. lambda value≈1). The rich combustion mode may be achieved, for example, by actuating the fuel injector 160 to inject fuel into the engine combustion chambers 150 according to a multi-injection pattern including one or more of fuel after-injections. An after-injection is a fuel injection which is performed by the fuel injector 160 after the Top Dead Center (TDC) of the piston 140 and before the opening of the exhaust ports 220, so that the after-injected fuel quantity actually burns inside the combustion chamber but has not a significant impact on the torque generation. During the regeneration event, the ECU 450 is configured to control the position of an actuator, for example the VGT actuator 290 or the waste gate actuator 252, which affects the rotating speed of the turbine 250, in order to precisely obtain a desired boost pressure in the intake duct 205.

Figure 3:
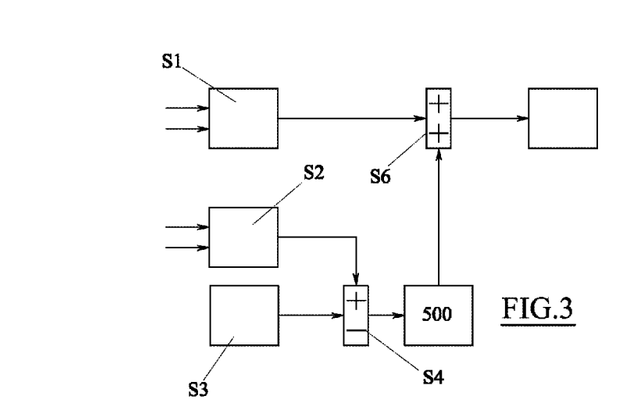
FIGS. 3-6 are schematic representations of the main steps of an embodiment of the present disclosure.

As shown in FIG. 3 if the turbine is a VGT 250, during the regeneration event, the ECU 450 is configured to control the position of the VGT actuator 290 affecting the position of the VGT 250, namely of the movable vanes of the VGT 250 which are actuated by the VGT actuator 290, in order to precisely obtain the desired boost pressure in the intake duct 205. To do so, the ECU 450 may be configured to determine the position of the VGT actuator 290 (i.e. the position of the VGT 250) according to an open-loop control strategy, and then to precisely regulate the determined VGT position by means of a close-loop control strategy of the pressure of the air that flows into the intake duct 205 downstream of the compressor 240 and upstream of the throttle valve 330.

In particular, the open-loop control strategy may provide for determining (block S1) the position of the VGT actuator 290 (i.e. the VGT 250) on the basis of the current engine operating point, i.e. the current values of the engine speed and engine torque. By way of example, the position of the VGT actuator 290 (VGT 250) can be provided as output of a pre-calibrated map which receives as input the current engine speed value and engine torque value. This map may be predetermined during experimental activities performed on a test bench and stored in the memory system 460.

Contemporaneously, the closed-loop control strategy may provide for setting (block S2) a target value of the air pressure into the intake duct 205 downstream of the compressor 240 and upstream of the throttle valve 330. This target value may be provided as an output of a pre-calibrated map which receives as input the current engine speed value and engine torque value. Also this map may be predetermined during experimental activities performed on a test bench and stored in the memory system 460. The ECU 450 may then be configured to determine (block S3) an actual pressure value of the air into the intake duct 205 downstream of the compressor 240 and upstream of the throttle valve 330.

According to an embodiment, the pressure value may be estimated by the ECU 450 on the basis of a current position of the throttle valve 330 and a current value of the air pressure within the intake manifold 200, which may be measured by the manifold pressure and temperature sensor 350, the air mass flow measured by the mass airflow sensor 340 and the estimated temperature of the air into the intake duct 205 downstream of the compressor 240 and upstream of the throttle valve 330. For example, the position of the throttle valve 330, the mass air flow and the intake manifold pressure may be monitored by the ECU 450 and used as input of a physical model that yields as output a corresponding value of the air pressure into the duct 205 downstream of the compressor 240 and upstream of the throttle valve 330.

According to other embodiments, the value of the air pressure may be measured by means of a dedicated pressure sensor 206, which is located in the intake duct 205 between the compressor 240 and the throttle valve 330. Knowing these quantities, the ECU 450 may be configured to calculate (S4) a difference between the estimated or measured pressure value and the target value and to use the calculated difference as input of a first controller 500, for example a proportional-integrative-derivative (PID) controller, whose output is added (block S6) to the VGT actuator position (determined in block S1), thereby regulating the position of the VGT actuator 290 (i.e. the VGT 250) in such a way to minimize the calculated difference.

According to the alternative embodiment shown in FIG. 7, during the regeneration event, the ECU 450 is configured to control the position of the waste gate actuator 252 which affects the position of the waste gate valve 251, in order to precisely obtain the desired boost pressure in the intake duct 205. To do so, the ECU 450 may operate as disclosed above following the same control scheme of FIG. 3, and in particular, the ECU 450 may be configured to determine the position of the waste gate actuator 252 according to an open-loop control strategy, and then to precisely regulate the determined waste gate actuator position by means of a close-loop control strategy of the pressure of the air that flows into the intake duct 205 downstream of the compressor 240 and upstream of the throttle valve 330.

In particular, the open-loop control strategy may provide for determining (block S1) the position of the waste gate actuator 252 (and/or the position of the waste gate valve 251) on the basis of the current engine operating point, i.e. the current values of the engine speed and engine torque. By way of example, the position of the waste gate actuator 252 can be provided as output of a pre-calibrated map which receives as input the current engine speed value and engine torque value. This map may be predetermined during experimental activities performed on a test bench and stored in the memory system 460. Contemporaneously, the closed-loop control strategy may provide for setting (block S2) a target value of the air pressure into the intake duct 205 downstream of the compressor 240 and upstream of the throttle valve 330. This target value may be provided as an output of a pre-calibrated map which receives as input the current engine speed value and engine torque value. Also this map may be predetermined during experimental activities performed on a test bench and stored in the memory system 460. The ECU 450 may then be configured to determine (block S3) an actual pressure value of the air into the intake duct 205 downstream of the compressor 240 and upstream of the throttle valve 330.

According to an embodiment, the pressure value may be estimated by the ECU 450 on the basis of a current position of the throttle valve 330 and a current value of the air pressure within the intake manifold 200, which may be measured by the manifold pressure and temperature sensor 350, the air mass flow measured by the mass airflow sensor 340 and the estimated temperature of the air into the intake duct 205 downstream of the compressor 240 and upstream of the throttle valve 330. For example, the position of the throttle valve 330, the mass air flow and the intake manifold pressure may be monitored by the ECU 450 and used as input of a physical model that yields as output a corresponding value of the air pressure into the duct 205 downstream of the compressor 240 and upstream of the throttle valve 330.

According to other embodiments, the value of the air pressure may be measured by means of a dedicated pressure sensor 206, which is located in the intake duct 205 between the compressor 240 and the throttle valve 330. Knowing these quantities, the ECU 450 may be configured to calculate (S4) a difference between the estimated or measured pressure value and the target value and to use the calculated difference as input of a first controller 500, for example a proportional-integrative-derivative (PID) controller, whose output is added (block S6) to the waste gate actuator position (determined in block S1), thereby regulating the position of the waste gate actuator 252 in such a way to minimize the calculated difference.

Figure 4:
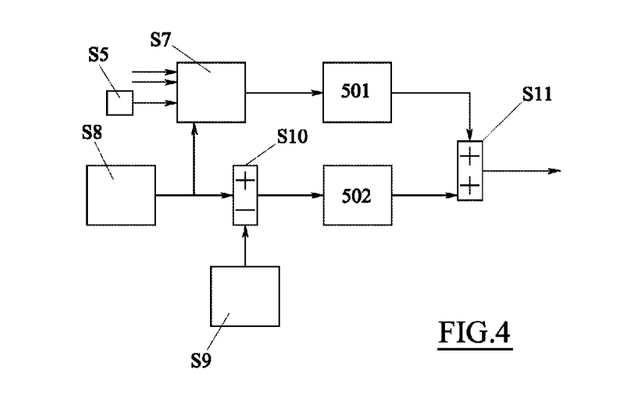

As shown in FIG. 4, at the same time during the execution of the regeneration event, the ECU 450 may be configured to set a target value of the air mass flow rate through the throttle valve 330 (S5) and a target value of the pressure of the air into the intake manifold 200 (S8), and to control the position of the throttle valve 330, namely the effective area of the throttle valve 330, in order to precisely obtain a target value of the air mass flow rate. To do so, the ECU 450 may be configured to determine the effective area of the throttle valve 330 according to an open-loop control strategy, and then to precisely regulate the determined effective area by means of a close-loop control strategy of the pressure of the air within the intake manifold 220.

In particular, the open-loop control strategy may provide for the ECU 450 to determine (block S7) the effective area of the throttle valve 330 on the basis of the following inputs: the target value of the air mass flow rate through the throttle valve 330, the target value of the pressure of the air into the intake manifold 200, the measured or estimated air pressure value into the intake duct 205 downstream of the compressor 240 and upstream of the throttle valve 330, and an air temperature value into the intake duct 205 downstream of the compressor 240 and upstream of the throttle valve 330 (that can be estimated using a map determined via experimental activities performed on a test bench and stored in the memory system 460).

In greater details, the open-loop control strategy may use the following formula:

$$A_{eff,OLA} = \frac{\dot{m}_{throttle,TGT} * f(\beta) * \sqrt{R * T_{up,throttle}}}{p_{intake,TGT}}$$

wherein, $A_{eff,OL}$ is the effective area of the throttle valve 330;

$\dot{m}_{throttle}$ is the target value of air mass flow rate through the throttle valve 330;

$T_{up,throttle}$ is the air temperature value into the intake duct 205 downstream of the compressor 240 and upstream of the throttle valve 330;

$p_{intake}$ is the target value of the pressure of the air into the intake manifold 200;

$f(\beta)$ is a flow coefficient (mapped in function of β, that is the ratio between the pressure values upstream and downstream of the throttle valve 330); and R is the ideal gas constant.

A low-pass filter 501 may be used to improve the reliability of the effective area $A_{eff,OL}$ of the throttle valve 330 as calculated.

Contemporaneously, the closed-loop control strategy may provide for the ECU 450 to determine (block S9) an actual pressure value of the air into the intake manifold 200 downstream of the throttle valve 330. For example, the ECU 450 may be configured to measure the pressure value of the air into the intake manifold 200 by means of the manifold pressure and temperature sensor 350. The ECU 450 is then configured to calculate (block S10) a difference between the measured pressure value and the determined target value thereof and to use the calculated difference as an input of a second controller 502, for example a proportional-integrative (PI) controller, whose output is added (block S11) to the effective area (determined by the open-loop control strategy), thereby regulating the effective area and thus the position of the throttle valve 330 in such a way to minimize the calculated difference.

Figure 5:
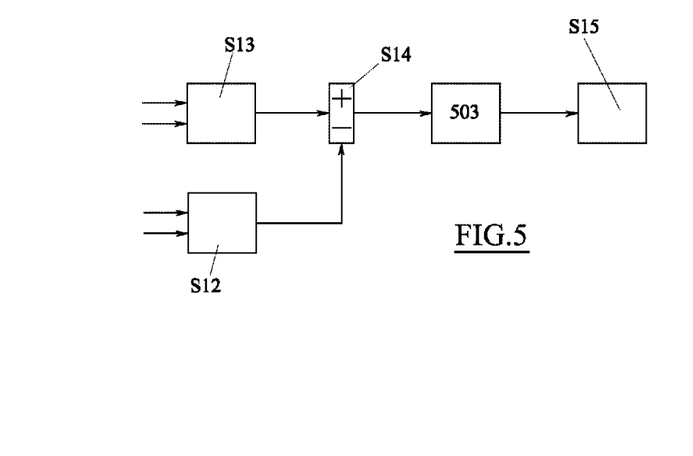

At the same time during the execution of the regeneration event, the ECU 450 may be configured to regulate a position of the EGR valve 320 by means of a closed-loop control of the quantity of the exhaust gas recirculated in the EGR duct 300, as represented in FIG. 5. To do so, the ECU 450 may be configured to determine a quantity value (block S12) of the exhaust gas recirculated into the EGR duct 300 and a target value (block S13) thereof. For example, the quantity value may be estimated on the basis of the difference between the estimated total gas mass flow that can enter the engine (calculated knowing the engine volumetric efficiency and the intake manifold temperature and pressure) and the fresh air mass flow measured the mass airflow, pressure, temperature sensor 340. The target value of the exhaust gas recirculated into the EGR duct 300 may be provided as an output of a pre-calibrated map which receives as input the current engine speed value and engine torque value. This map may be predetermined during experimental activities performed on a test bench and stored in the memory system 460.

The ECU 450 is then configured to calculate (block S14) a difference between the quantity value and the target value and to use the calculated difference as an input of a third controller 503, for example a proportional-integrative-derivative controller (PID), configured to regulate (block S15) the position of the EGR valve 320 in such a way to minimize the calculated difference.

Figure 6:
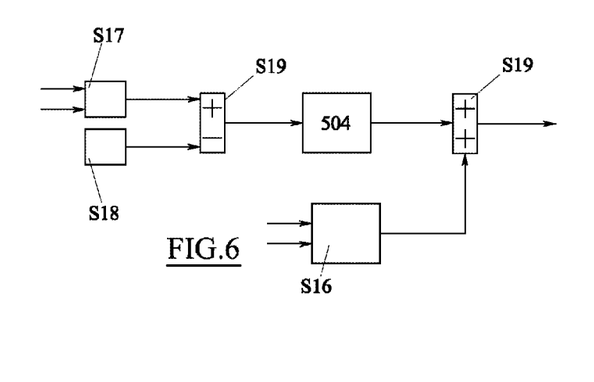

As shown in FIG. 6, at the same time during the execution of the regeneration event, the ECU 450 may be configured to determine the fuel quantity injected by the fuel injector 160 as an after-injection with an open-loop control strategy, and then to precisely regulate the fuel quantity injected by the fuel injector 160 as an after-injection by means of a close-loop control strategy of a lambda value of the exhaust gas in the exhaust gas line 275. In particular, the open-loop control strategy may provide for determining (block S16) the fuel quantity injected by the fuel injector 160 as an after-injection on the basis of the current engine operating point, i.e. the current values of the engine speed and engine torque. By way of example, the fuel quantity injected by the fuel injector 160 as an after-injection can be provided as output of a pre-calibrated map which receives as input the current engine speed value and engine torque value. This map may be predetermined during experimental activities performed on a test bench and stored in the memory system 460.

Contemporaneously, the closed-loop control strategy may provide for determining (block S18) an actual lambda value of the exhaust gas in the exhaust gas line 275. For example, the lambda value may be measured by a lambda sensor 276 disposed in the exhaust gas line 275. The ECU 450 is also configured to determine (block S17) a target value of the lambda value of the exhaust gas. The target value of the of the lambda value of the exhaust gas may be provided as an output of a pre-calibrated map which receives as input the current engine speed value and engine torque value. This map may be predetermined during experimental activities performed on a test bench and stored in the memory system 460.

Contemporaneously, the ECU 450 is configured to calculate (block S19) a difference between the target value and the determined lambda value, and to use the calculated difference as an input of a fourth controller 504, for example a proportional-integrative-derivative controller (PID) or a proportional-integrative controller (PI), whose output is added (block S20) to the fuel quantity injected by the fuel injector 160 as an after-injection (determined in block S16) in such a way to minimize the calculated difference.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An internal combustion engine having an intake manifold, a combustion chamber and an exhaust manifold, the internal combustion engine comprising:
   a Lean $NO_x$ Trap;
   a turbocharger having a compressor in fluid communication with the intake manifold, a turbine in fluid communication with the exhaust manifold, and a turbine speed actuator configured to control a rotating speed of the turbine;
   an exhaust gas recirculation duct coupled between the exhaust manifold and the intake manifold;
   an exhaust gas recirculation valve regulating a flow of exhaust gases in the exhaust gas recirculation duct; and
   an electronic control unit configured to:
   adjust a position of the turbine speed actuator using first open-loop control strategy based on an actual engine speed and an actual engine load;
   execute a regeneration event of the Lean $NO_x$ Trap;
   regulate the position of the turbine speed actuator using a first closed-loop control strategy to minimize a difference between a target first air pressure value and an actual first air pressure value in an intake duct downstream of the compressor of the turbocharger and upstream of a throttle valve in the intake duct during the execution of the regeneration event;
   adjust a position of the exhaust gas recirculation valve using a second open-loop control strategy based on the actual engine speed and the actual engine load; and
   regulate the position of the exhaust gas recirculation valve using a second closed-loop control strategy to minimize a difference between a target exhaust gas flow value and an actual exhaust gas flow value to the intake manifold during the execution of the regeneration event.

2. The internal combustion engine according to claim 1, wherein the electronic control unit is further configured to estimate the actual first air pressure value on the basis of a position of the throttle valve.

3. The internal combustion engine according to claim 1, wherein the electronic control unit is further configured to measure the actual air pressure value using a pressure sensor disposed in the intake duct downstream of the compressor and upstream of the throttle valve.

4. The internal combustion engine according to claim 1, wherein the electronic control unit is further configured to:
   adjust a position of the throttle valve using a third open-loop control strategy based on the actual engine speed and the actual engine load; and
   regulate the position of the throttle valve using a third closed-loop control strategy to minimize a difference between a target second air pressure value and an actual second air pressure value in the intake manifold downstream of the throttle valve during the execution of the regeneration event.

5. The internal combustion engine according to claim 4, wherein the electronic control unit is further configured to determine the position of the throttle valve based on at least one of the actual first air pressure value, an air temperature value in the intake duct downstream of the compressor and upstream of the throttle valve, a target value of an air mass flow rate through the throttle valve and the target second air pressure value.

6. The internal combustion engine according to claim 1, further comprising:

a fuel injector configured to inject fuel into the combustion chamber;

wherein the electronic control unit is configured to:
determine an after-injection fuel quantity based on the actual engine speed and the actual engine load;
adjust the after-injection fuel quantity using a fourth closed-loop control strategy to minimize a difference between a target lambda value of the exhaust vas and an actual lambda value of the exhaust gas during the execution of the regeneration event; and
control the fuel injector for injecting the adjusted after-injection fuel quantity into the combustion chamber.

7. A method for regenerating a lean NOx trap in an internal combustion engine having a turbocharger having a compressor, a turbine, a turbine speed actuator, an exhaust gas recirculation duct coupled between an exhaust manifold of the engine combustion chamber and an intake manifold, and an exhaust gas recirculation valve regulating a flow of exhaust gases in the exhaust gas recirculation duct, the method comprising:
adjusting a position of the turbine speed actuator using a first open-loop control strategy based on an actual engine speed and an actual engine load;
initiating a regeneration event of the Lean $NO_x$ Trap;
regulating the position of the turbine speed actuator using a first closed-loop control strategy to minimize a difference between a target first air pressure value and an actual first air pressure value in an intake duct downstream of the compressor of the turbocharger and upstream of a throttle valve in the intake duct during the execution of the regeneration event;
adjusting a position of the exhaust gas recirculation valve using a second open-loop control strategy based on the actual engine speed and the actual engine load; and
regulating the position of the exhaust gas recirculation valve using a second closed-loop control strategy to minimize a difference between a target exhaust gas flow value and an actual exhaust gas flow value to the intake manifold during the execution of the regeneration event.

8. The method according to claim 7, further comprising estimating the actual air pressure value on the basis of a position of the throttle valve.

9. The method according to claim 7, further comprising measuring the actual air pressure value using a pressure sensor disposed in the intake duct downstream of the compressor and upstream of the throttle valve.

10. The method according to claim 7, further comprising:
adjusting a position of the throttle valve using a third open-loop control strategy based on the actual engine speed and the actual engine load; and
regulating the position of the throttle valve using a third closed-loop control strategy to minimize a difference between a target second air pressure value and an actual second air pressure value in the intake manifold downstream of the throttle valve during the execution of the regeneration event.

11. The method according to claim 7, further comprising determining the position of the throttle valve based on at least one of the actual first air pressure value, an air temperature value in the intake duct downstream of the compressor and upstream of the throttle valve, a target value of an air mass flow rate through the throttle valve and the target second air pressure value.

12. The method according to claim 7, for regenerating the lean NOx trap in an internal combustion engine having a fuel injector configured to inject fuel into the combustion chamber, the method comprising:
determining an after-injection fuel quantity based on the actual engine speed and the actual engine load:
adjusting the after-injection fuel quantity using a fourth closed-loop control strategy to minimize a difference between a target lambda value of the exhaust gas and an actual lambda value of the exhaust gas during the execution of the regeneration event; and
controlling the fuel injector for injecting the adjusted after-injection fuel quantity into the combustion chamber.

13. An internal combustion engine comprising:
an intake manifold, a combustion chamber and an exhaust manifold;
a turbocharger having a compressor in fluid communication with the intake manifold and a turbine in fluid communication with the exhaust manifold, and a turbine speed actuator configured to control a rotating speed of the turbine;
an exhaust gas recirculation system including an EGR duct coupled between the exhaust manifold and an intake manifold, and an EGR valve regulating a flow of exhaust gases in the exhaust gas recirculation duct;
a fuel injection system including a fuel injector configured to inject fuel into the combustion chamber;
a lean $NO_x$ trap downstream of the turbine and in fluid communication with exhaust manifold; and
an electronic control unit configured to execute a regeneration event of the Lean $NO_x$ Trap, the electronic control unit further comprising:
a first controller configured to:
adjust a position of the turbine speed actuator using an open-loop control strategy based on an actual engine speed and an actual engine load; and
regulate the position of the turbine speed actuator-using a closed-loop control strategy to minimize a difference between a target first air pressure value and an actual first air pressure value in an intake duct downstream of the compressor of the turbocharger and upstream of a throttle valve in the intake duct during the execution of the regeneration event;
a second controller configured to:
adjust a position of the throttle valve using a second open-loop control strategy based on the actual engine speed and the actual engine load; and
regulate the position of the throttle valve using a second closed-loop control strategy to minimize a difference between a target second air pressure value and an actual second air pressure value in the intake manifold downstream of the throttle valve during the execution of the regeneration event;
a third controller configured to:
adjust a position of the exhaust gas recirculation valve using a third open-loop control strategy based on the actual engine speed and the actual engine load; and
regulate the position of the exhaust gas recirculation valve using a third closed-loop control strategy to minimize a difference between a target exhaust gas flow value and an actual exhaust gas flow value to the intake manifold during the execution of the regeneration event; and
a fourth controller configured to:
determine an after-injection fuel quantity based on the actual engine speed and the actual engine load;

adjust the after-injection fuel quantity using a fourth closed-loop control strategy to minimize a difference between a target lambda value of the exhaust gas and an actual lambda value of the exhaust gas during the execution of the regeneration event; and control the fuel injector for injecting the adjusted after-injection fuel quantity into the combustion chamber.

\* \* \* \* \*